(12) United States Patent
Anders et al.

(10) Patent No.: US 8,067,690 B2
(45) Date of Patent: Nov. 29, 2011

(54) MODULE RECEPTACLE

(75) Inventors: Armin Anders, Taufkirchen (DE); Erwin Grassl, St. Heinrich (DE); Frank Schmidt, Altkirchen (DE)

(73) Assignee: Enocean GmbH, Oberhaching (DE)

( * ) Notice: Subject to any disclaimer, the term of this patent is extended or adjusted under 35 U.S.C. 154(b) by 1127 days.

(21) Appl. No.: 11/809,168

(22) Filed: May 31, 2007

(65) Prior Publication Data
US 2008/0296296 A1 Dec. 4, 2008

(51) Int. Cl.
*H02G 3/08* (2006.01)
(52) U.S. Cl. ............... 174/50; 174/53; 174/59; 220/3.2; 220/3.3; 361/728
(58) Field of Classification Search .......... 174/50, 174/53, 57, 58, 66, 67, 59; 220/3.2–3.9, 220/4.02, 241, 242; 439/535, 536; D8/353; D13/177; 361/728, 679.01
See application file for complete search history.

(56) References Cited

U.S. PATENT DOCUMENTS

| | | | | |
|---|---|---|---|---|
| 3,562,468 A | * | 2/1971 | Stefani | 174/53 |
| 4,733,330 A | * | 3/1988 | Tanaka et al. | 174/66 |
| 4,857,669 A | * | 8/1989 | Kitamura et al. | 174/53 |
| 5,036,168 A | * | 7/1991 | Kikuchi et al. | 174/53 |
| 6,616,005 B1 | * | 9/2003 | Pereira et al. | 220/241 |
| 6,943,297 B2 | * | 9/2005 | Capella | 174/66 |
| 7,538,271 B2 | * | 5/2009 | O'Young et al. | 174/66 |

* cited by examiner

*Primary Examiner* — Angel R Estrada
(74) *Attorney, Agent, or Firm* — Foley & Lardner LLP; Matthew L. Fenselau

(57) ABSTRACT

A module receptacle having a main frame arranged to hold a mountable functioning module in a specified position with respect to a covering frame. The covering frame can be attached by means of at least one fastening element to the main frame. The covering frame is at least large enough to cover the main frame.

14 Claims, 8 Drawing Sheets

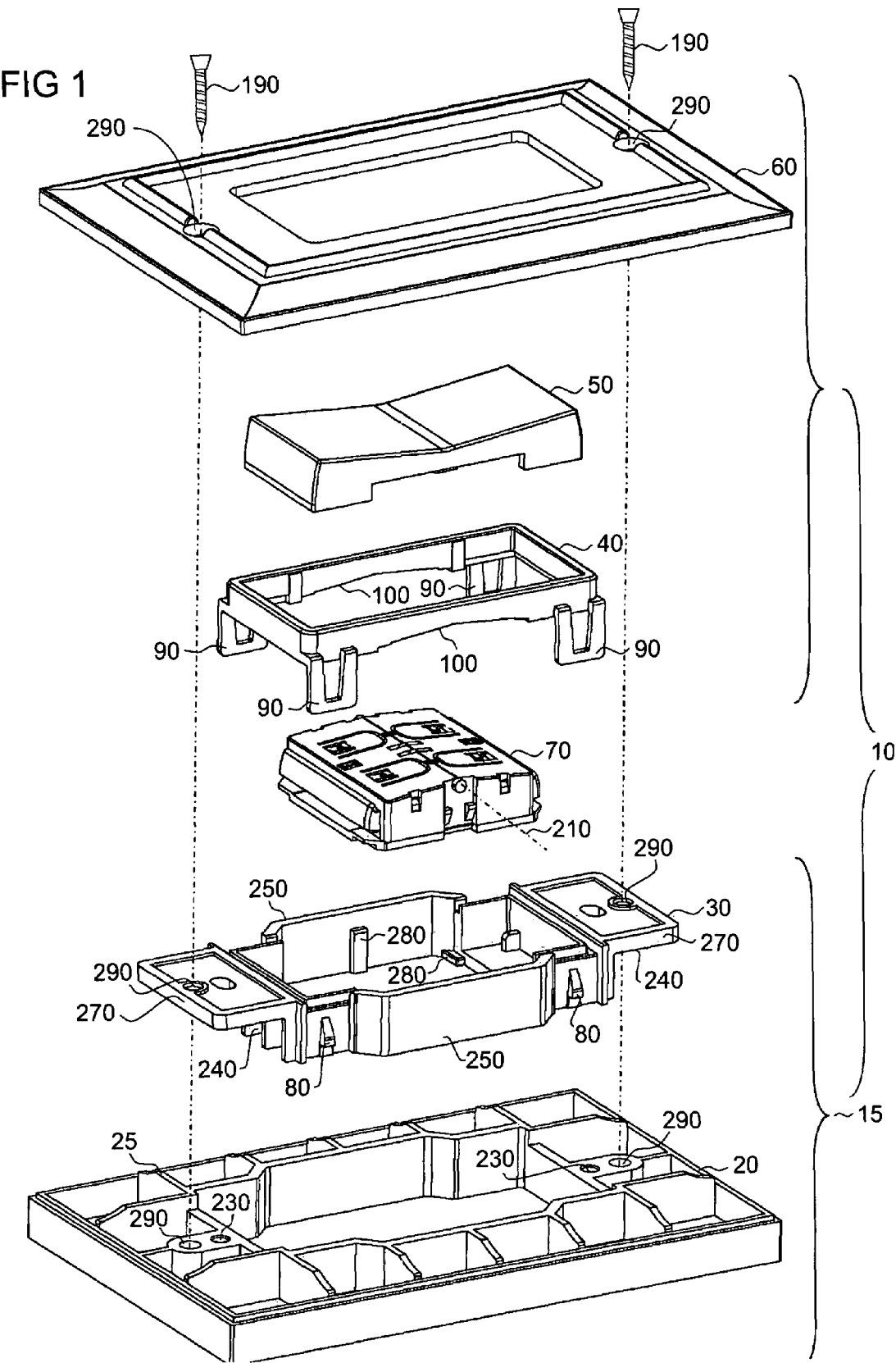

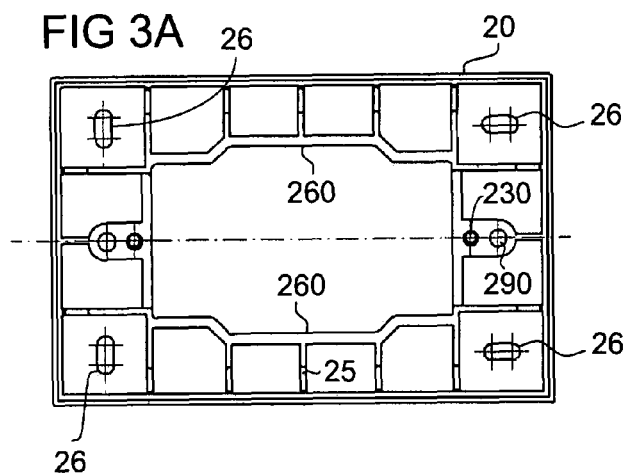
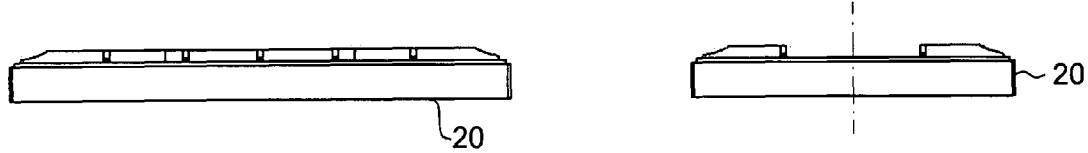
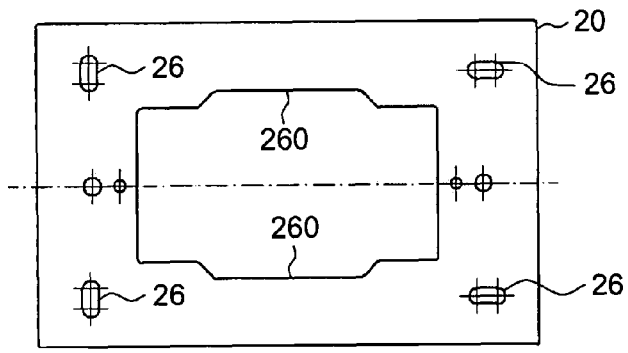

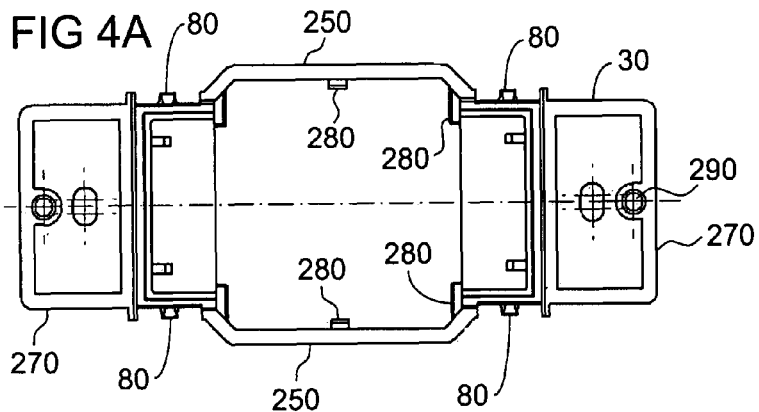
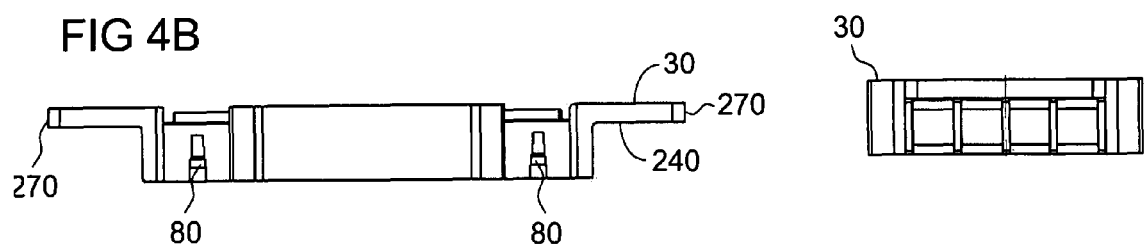
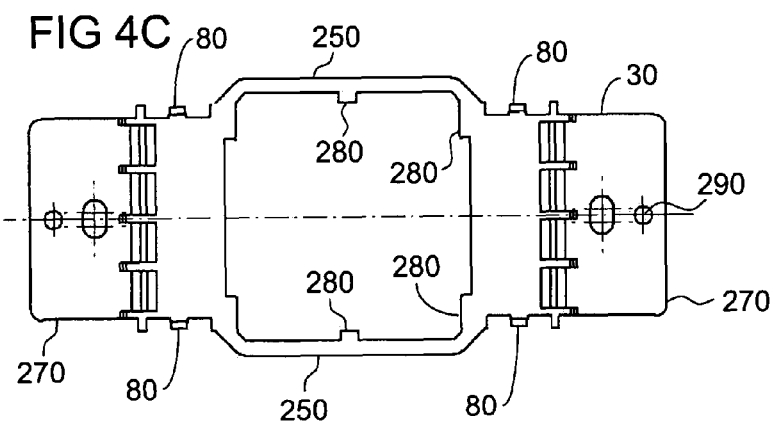

MODULE RECEPTACLE

FIELD OF THE INVENTION

The invention concerns a module receptacle.

BACKGROUND OF THE INVENTION

A module receptacle serves the purpose, among others, of holding a functional module for wall mounting. The module receptacle here does not only have the purpose of holding the module, but also meets design requirements, particularly when the external appearance of the module receptacle is intended to cover the functional module.

The positioning within a room and the visual design of wall-mounted switches, such as those used for room lighting, permits them to suggest their purpose and method of use to a user. Surface-mounted and flush-mounted wall-switches, for instance, in which an electromechanical switch, connected by wires, switches an electrical device on and off, are familiar. The mechanical size of these switches requires either surface mounting by means of a housing with dimensions that are large enough to contain the electromechanical switch, or flush-mounting in which the electromechanical switching element is positioned behind the surface of the wall in what is known as a flush-mounting box. Only the operating elements and a surrounding frame are positioned on the surface of the wall. The user recognizes the function of a switch of this sort simply through its external shape and the site of its installation. As a consequence, it is helpful for new technologies also to adopt the external form and positioning of a switch of the familiar type.

SUMMARY OF THE INVENTION

One object of the present invention is to combine new technologies, that permit the physical size of the functional elements to be changed, with the conventional structural form and appearance of wall-mounted switches.

This and other objects are attained in accordance with one aspect of the present invention directed to a module receptacle having a main frame designed to hold a mountable functioning module in a specified position with respect to a covering frame. The covering frame can be attached by means of at least one fastening element to the main frame. The covering frame is at least large enough to cover the main frame.

BRIEF DESCRIPTION OF THE DRAWINGS

Implementations of the invention are described in more detail further below, making reference to the drawings, whereby the same reference codes have been used to indicate the same or similarly functioning elements.

FIG. 1 is a general view of the subsidiary components,

FIGS. 3a to 3c show a base frame;

FIGS. 4a to 4c show an insert frame;

BRIEF DESCRIPTION OF THE DRAWINGS

Figure 2A:
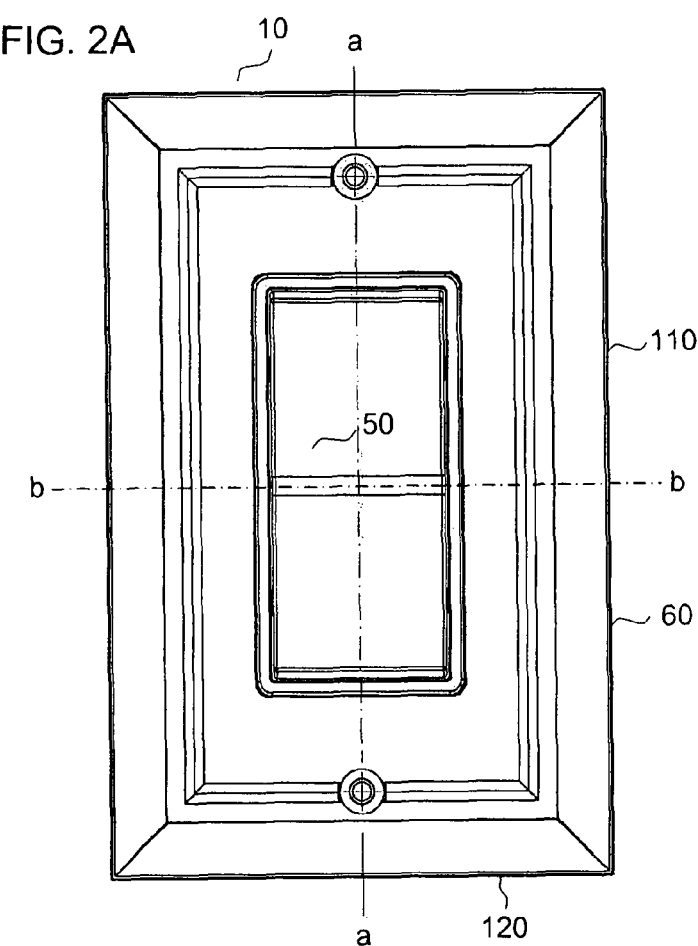
FIGS. 2a, 2b and 2c show a general view of the subsidiary components as a plan view, a cross-section taken at line a-a, and a cross-section taken at line b-b, respectively.

FIG. 1 shows, in perspective, an exploded drawing of the module receptacle 10, the individual components of the module receptacle 10, and a functional module 70. The module receptacle 10 comprises a main frame 15 that includes a base frame 20 and an insert frame 30. The module receptacle 10 also includes a holding frame 40, an operating element 50 and a covering frame 60, as well as two fastening elements 190. The fastening elements take the form of threaded bolts in the illustrated implementation. The base frame 20 provides a foundation or base for the module receptacle 10, on which the structural elements of the module receptacle are positioned. For static reinforcement the base frame 20 incorporates individual bridges 25 that impart greater resistance to twisting to the base frame. The base frame 20 further features at least one first hole 26 with which the base frame can be fastened to another body such as, for instance, a wall. The base frame has a recess in the center that accepts the insert frame 30.

The insert frame 30 is designed in such a way that it can be inserted with positive lock into the base frame 20. This does not mean that the insert frame 30 is engaged positively on all of its external sides with the walls of the base frame 20, but at least two outer walls 250 of the insert frame are formed in such a way as to engage positively with two corresponding elements 260 on the base frame 20. The insert frame 30 has two horizontal fastening lugs 270, positioned opposite one another and facing outwards. These, in turn, feature a height limiting stop 240 that prevents the insert frame 30 from being pushed too far into the base frame 20.

Guide elements 280 are positioned on the inner sides of the walls of the insert frame 30. The guide elements 280 fix the functional module 70 at a specified position within the insert frame 30. The functional module 70 ha's an essentially rectangular or square shape. The functional module shown in this example of an implementation is a self-powered radio switch. Other functional modules can also be held in the module receptacle. When the external shape is the same, the insert frame 30 can be used in a form no different to that of the implementation shown here as an example. If the external shape of the functional module is different, the insert frame and, if necessary, also the holding frame 40, can be modified to match the changed shape.

The fixing of the functional module 70 within the insert frame 30 is created in such a way that latching elements 80 are positioned on the insert frame 30, and these interact with counter-latching elements 90 on holding frame 40. When in the assembled position, the holding frame 40 is held in its place within the insert frame 30 by the latching elements 80 that are now latched to the counter-latching elements 90. The holding frame 40 is constructed in such a way that component elements 100 extend across the functional module 70, thereby holding it in place in the insert frame 30.

An operating element 50 of a different form may be used, depending on the construction of the functional module 70. The implementation shown illustrates an operating element 50 that offers three switching positions, like those of a rocker switch. There is a central, neutral position, and first and second switch positions for two different functions such as, for instance, "on" or "off".

For this purpose the operating element is functionally coupled to the functional module, so that activation of the operating element 50, or the exercise of force upon it, is also transferred to the functional module.

To supply power to the functional element, the cutout in the covering frame, or the covering frame itself, or even both elements, namely the cutout and the covering frame, are formed as photovoltaic solar power converters. In this way the functional module can be supplied with energy, additionally or exclusively, through the electrical energy obtained in this way.

The entire construction including the base frame 20, the insert frame 30, the functional module 70 and the holding frame 40 is covered by the covering frame 60. The covering frame 60 thus fulfils the task of meeting the aesthetic requirements and also of covering the structures used to fasten the functional module. In addition, the fastening elements 190 serve not only to fasten the covering frame 60 to the base frame 20, but also to attach the insert frame 30 to the base frame 20. At least one hole 290 is provided for this purpose. The implementation shown has two holes 290, located at opposite sides of the covering frame. The holes 290 are positioned in the covering frame and base frame in such a way that they align with one another.

Figure 2B:
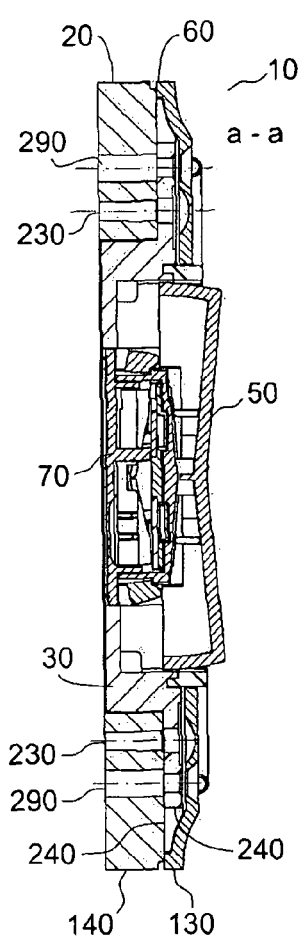
Figure 2C:
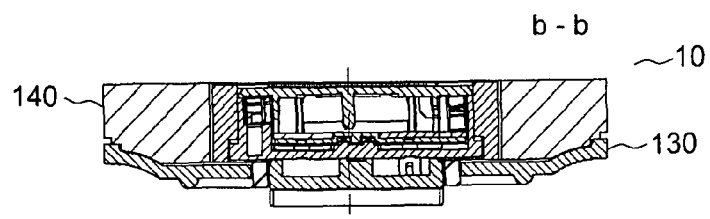

The correctly scaled illustration of FIGS. 2a, 2b, 2c shows the module receptacle in an assembled state. Details of the module receptacle are shown from above in FIG. 2a, and in a sectional view through the axis aa in FIG. 2b and the axis bb in FIG. 2a. The dimensionally correct illustration shows the favorable ratio between the long side of the module receptacle and the short side of the module receptacle. The operation of devices with an external appearance that matches a specified pattern, or is at least similar to such a design, is thereby almost self-explanatory, and they may be employed by a user without further explanation or description, since the operation, meaning and purpose of the device is already obvious to the user as a result of its external appearance. This is, for instance, the case for light switches. The external appearance chosen for this implementation has a ratio of between 1.4 and 1.7 between the two sides. This means that the length of the long side is greater than the length of the short side by a factor of between 1.4 and 1.7. A ratio between the two sides of between 1.5 and 1.6 is particularly favorable. This has the advantage that module receptacles of this type can be integrated into conventional house installations, without negatively affecting the aesthetic sensitivities of the house occupant or user.

The sectional view aa in FIG. 2b illustrates the function of the height limiting stop 240. The height-limiting stop 240 is designed in such a way that the insert frame 30 can only enter the base frame far enough for the bottom surface of the base frame 20, the bottom surface of the insert frame 30 and the bottom surface of the functional module 70 to be flush with one another. These sectional views in FIG. 2b and FIG. 2c also show that the outer edges 140 of the base frame 20 are flush with the outer edges 130 of the covering frame 60.

FIG. 3a shows a detailed view from above, FIG. 3b shows a side view and different view, and FIG. 3d shows the base frame 20 with its component elements in a view from below. For the purposes of mechanical stabilization, the base frame 20 has bridges that create a number of small boxes in the base frame 20. This lends particular resistance to twisting and mechanical strength to the base frame 20. The base frame 20 can be fastened to a further body by means of holes, located in the outer corner segments of the base frame 20. The wall of a room is an example of such a body. The base frame 20 has an opening at its center. The opening is surrounded by internal walls that positively engage the insert frame 30, at least along its long side, so that the insert frame 30 is fixed in position in the base frame. The two holes 230 are also provided for fastening the base frame to a further body such as, for instance, the wall of a room. The holes 290 are provided to fasten the further elements of the module receptacle such as, for instance, the covering frame.

FIGS. 4a to 4c show the insert frame 30 in detail. FIG. 4a shows a view from above of the insert frame 30, FIG. 4b shows a side and front view, while FIG. 4c shows a view from below. The illustration is properly dimensioned. The outer walls 250 of the insert frame 30 engage positively with the inner walls of the base frame 20. Guide elements 280 are located, in turn, on the inner walls of the insert frame, and these correspond to recesses 285 (see FIGS. 5b and 5c) in the functional module 70. The latching elements 80, of which there are 4 in the implementation shown, are located on the outer walls 250 of the insert frame 30. It is therefore possible to fasten the holding frame 40 to the insert frame 30 at four points.

Implementations involving positively engaged fits are described above. Other methods of fitting, however, can be used to fix the functional module in a specified position. Positive engagement is a favourable method of fitting, but is not the only possible method of fitting by which the functional module can be fixed.

FIG. 4b shows a side view, also correctly dimensioned, of the height-limiting stop 240 and the latching elements 80.

FIG. 4c shows a correctly scaled view from below of the insert frame described.

Figure 5A:
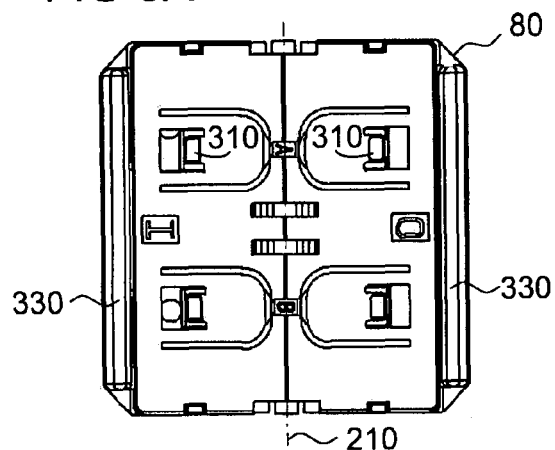
FIGS. 5a to 5c show a functional module.
Figure 5B:
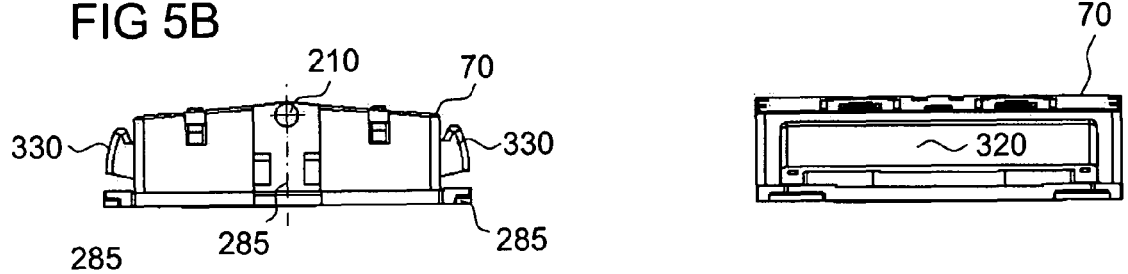
Figure 5C:
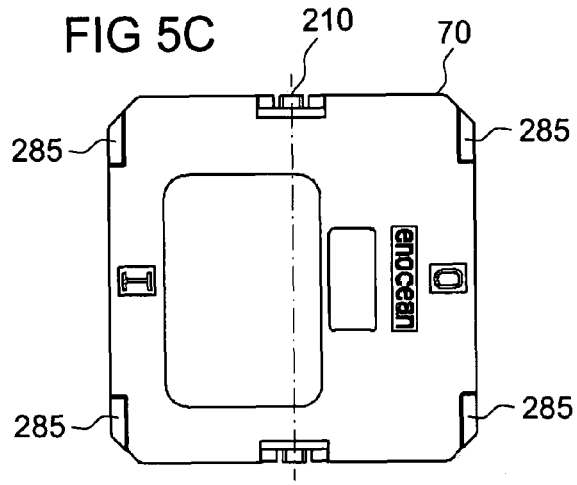

FIGS. 5a to 5c show the housing of a functional module 70. In this implementation, this is a radio switch module having its own power supply, the power supply being formed of an electromechanical energy converter integrated into the functional module. The functional module can have a wide range of functions. Various functional modules can be mounted in the module receptacle, since the function of the functional module is implemented through electronic components within the housing of the functional module rather than by the shape of the housing of the functional module. It is therefore generally possible to combine functional modules other than functional modules described in the example implementation with the module receptacle. These include, for instance, light sensors, heat sensors, humidity sensors, infrared sensors, proximity sensors or, in general, sensors for the acquisition of physical parameters. In these cases it is possible to transfer the information obtained to a remote unit by means of a radio signal. The functional module 70 of the example implementation has an axle 210. This is provided so that the operating element 50 can turn while being held in the functional module 70. The recesses 285 in the functional module are provided so that a definite position can be given to the functional module within the insert frame by means of the guide elements on the insert frame. The functional module 70 also has a touch-switch 310. An energy lever 330 is included in the functional module in this implementation, in order to operate an electromechanical energy converter within the housing of the functional module 70.

Supplying the power to the functional module 70 by means of an electromechanical energy converter is described above. Other types of energy converter, however, can be used to supply the power to the functional module 70. A functional module 70 that does not call for mechanical activation by a user but instead, for instance, acquires electro-physical parameters from the environment, incorporates energy converters of a type other than electromechanical energy converters. Electro-voltaic or thermoelectric energy converters are favourably used for the power supply.

Figure 6A:
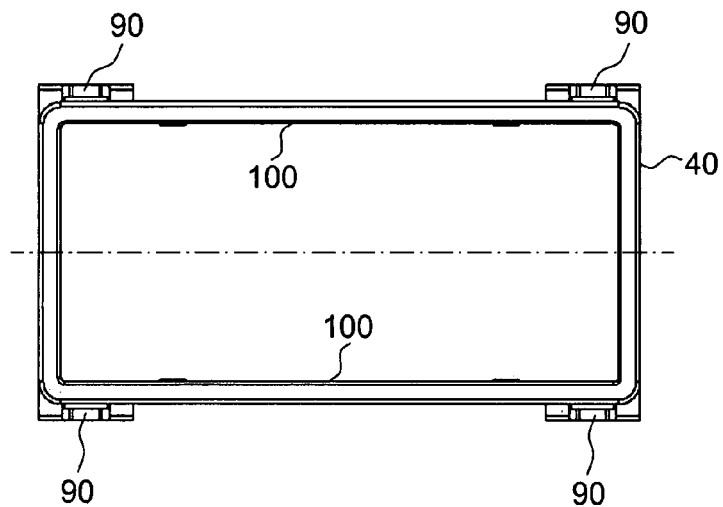
FIGS. 6a to 6c show a holding frame.
Figure 6B:
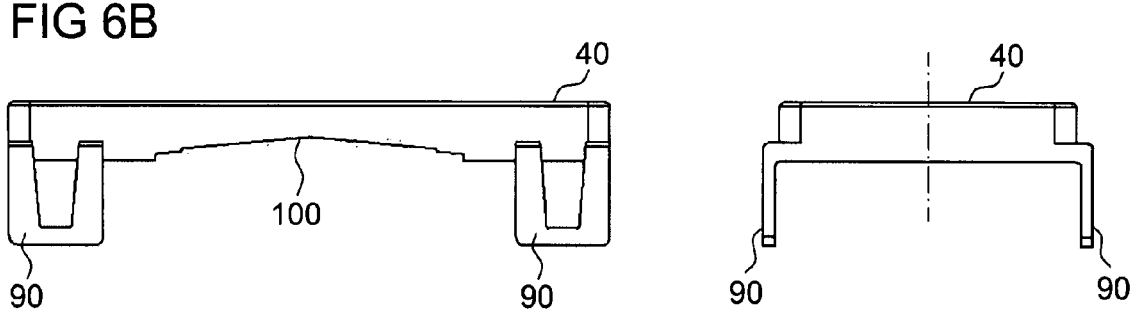
Figure 6C:
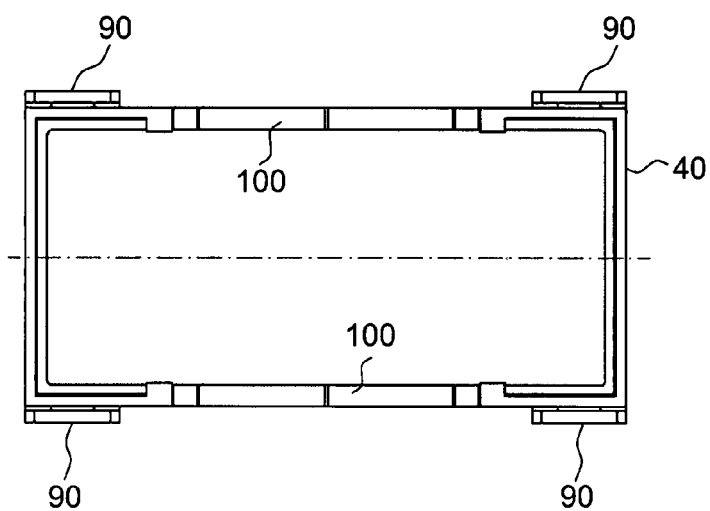

FIGS. 6a to 6c show a correctly dimensioned view from above of the holding frame 40. FIG. 6a shows the holding frame 40 from above, while FIG. 6b shows a side and a front view. FIG. 6c shows the holding frame 40 from below. Looking at both FIGS. 5a and 6a together shows that the component element 100 of the holding frame 40 extends across the functional module. The counter-latching elements 90, which act together with the latching elements 80 on the insert frame, fix the holding frame 40 in the insert frame 30. The functional module 70 is to be located between the holding frame 40 and the insert frame 30.

Figure 7A:
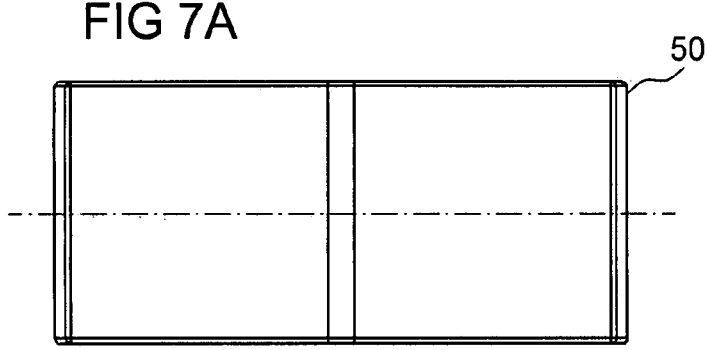
FIGS. 7a to 7c show an operating element.
Figure 7B:
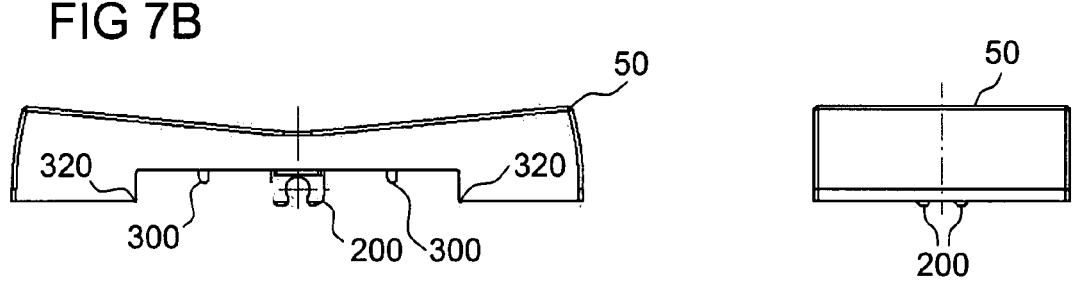
Figure 7C:
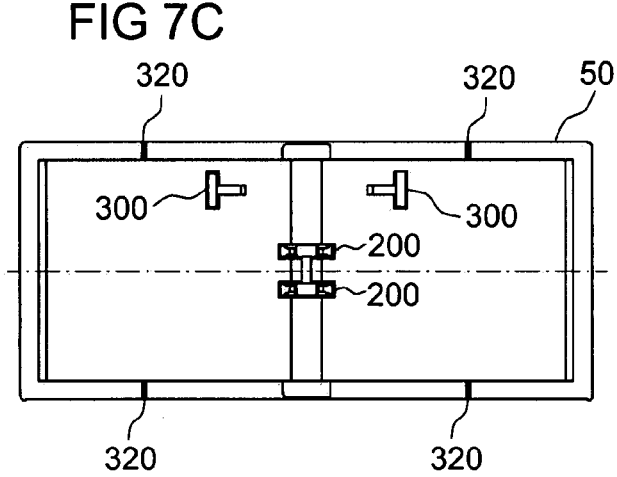

FIGS. 7a to 7c show a correctly dimensioned view of the operating element 50. It is shown from above in FIG. 7a. FIG. 7b shows a side view, while FIG. 7c shows a view from below. The operating element 50 is designed in such a way that it can be located movably within a centrally positioned cutout 160 in the covering frame 60. The ability to move the operating element 50 is created by an axle clip 200 which fixes the operating element 50 to axle 210 of the functional module 70 so that operating element 50 can rotate. The operating element 50 is therefore supported so that it can turn about the axle 210. The operating element 50 further incorporates a force transmission element 300 on its lower side that acts on the touch element 310 of the functional module 70. Rocking the operating element in one direction has the effect of causing the force transmission element 300 to act on a push switch 310 on the functional module 70. The operating element 50 incorporates pushing pieces 320 on both sides of the axle clip 200, positioned in such a way at the same distance from the axle that an energy lever 330 on the functional module 70 can be operated. The energy lever 330 transfers force to an electromechanical energy converter that is located within the functional module 70. The operating element 50, and the cutout 160 provided for it in the surrounding frame, have a predetermined ratio between their sides of between 1.9 and 2.1. In other words, the length of the long side is between 1.9 and 2.1 times the length of the short side. The advantages this provides have already been described in association with the ratio between the sides of the module receptacle as a whole.

Figure 8A:
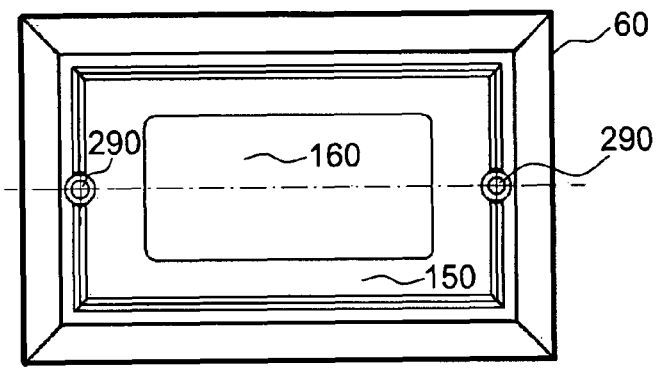
FIGS. 8a to 8c show a covering frame.
Figure 8B:
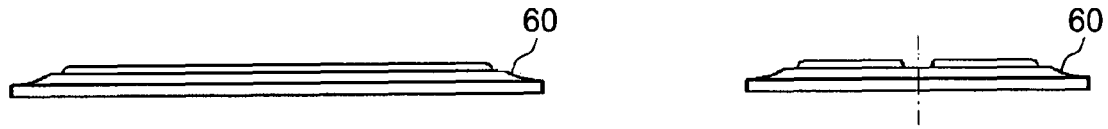
Figure 8C:
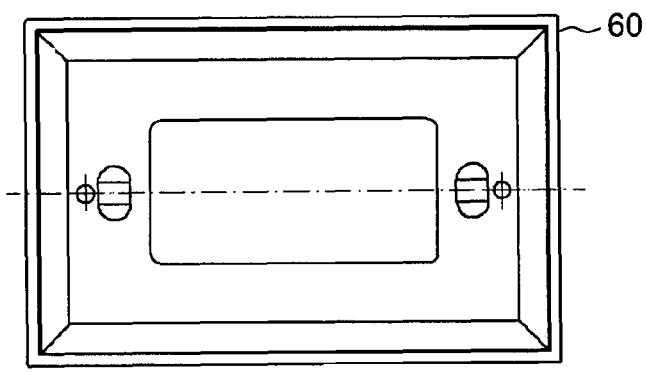

FIGS. 8a to 8c show a correctly dimensioned representation of the surrounding frame 60 with its covering surface 150 and central cutout 160. FIG. 8a here is a view from above, while FIG. 8b shows front and side views, and FIG. 8c shows a view of the surrounding frame from below. The holes 290 accept the fastening elements 190, and therefore serve to fasten the surrounding frame 60 to the other components of the module receptacle. This holds the entire construction, including the base frame, insert frame, functional module, holding frame and surrounding frame together.

The module receptacle having a surrounding frame that can accept a single functional module is described above. Module receptacles of this type are also possible for surrounding frames that can accept several functional modules located in parallel with one another. Surrounding frames of this type have the shape and extent of a number of surrounding frames in accordance with the description above positioned in parallel with one another. In this case, functional modules having different functions can be combined. A self-powered radio switching module can be located next to a self-powered sensor module, the two being covered by a common surrounding frame.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A module receptacle comprising:
a main frame arranged to hold a mountable functioning module in a specified position with respect to a covering frame, the covering frame being adapted to be attached by at least one fastening element to the main frame, and wherein the covering frame is at least large enough to cover the main frame;
wherein:
A) the covering frame is implemented as a photovoltaic solar energy converter, or
B) the functional module is a self-powered radio switch module having its own maintenance-free power supply and having an operating element designed to transfer mechanical operation energy to the functional module, or
C) the functional module is a self-powered sensor module having its own maintenance-free power supply, and set up to acquire physical parameters and to transmit them by wireless to a unit located at some distance.

2. The module receptacle in accordance with claim 1, further comprising a holding frame, wherein said main frame and said holding frame are arranged so that they can be fixed to each other mechanically to hold a functional module that can be fitted in a specified position with respect to the covering frame.

3. The module receptacle in accordance with claim 1, wherein the main frame includes a base frame and an insert frame.

4. The module receptacle in accordance with claim 1, wherein the covering frame and the main frame have the same ratio between their long and short sides, the long side being between 1.4 and 1.7 times as long as the short side.

5. The module receptacle in accordance with claim 1, wherein the outer edge of the covering frame is flush with the outer edge of the main frame.

6. The module receptacle in accordance with claim 4, wherein the covering frame has a cutout located in the center of its covering surface, the ratio between the long and short sides being between 1.9 and 2.1.

7. The module receptacle in accordance with claim 6, wherein the covering frame includes a number of parallel covering frames, coupled together, structurally linked or formed as single pieces.

8. The module receptacle in accordance with claim 1, wherein the covering frame is implemented as a photovoltaic solar energy converter.

9. The module receptacle in accordance with claim 1, wherein the functional module is a self-powered radio switch module having its own maintenance-free power supply and having an operating element designed to transfer mechanical operation energy to the functional module.

10. The module receptacle in accordance with claim 1, wherein the functional module is a self-powered sensor module having its own maintenance-free power supply, and set up to acquire physical parameters and to transmit them by wireless to a unit located at some distance.

11. The module receptacle in accordance with claim 10, wherein the self-powered sensor module incorporates a light sensor, a heat sensor, a humidity sensor or an infrared sensor.

12. The module receptacle in accordance with claim 1, wherein the covering frame and the main frame have the same ratio between their long and short sides, the long side being between 1.5 and 1.6 times as long as the short side.

13. A module receptacle comprising:
a main frame that accepts an insert frame, wherein a functional module is held in the insert frame, and
wherein the insert frame and a holding frame are arranged so that they are fixed to each other mechanically to hold the functional module in a specified position with respect to the base frame; and
wherein:
A) the functional module is a self-powered radio switch module having its own maintenance-free power supply and having an operating element designed to transfer mechanical operation energy to the functional module, or B) the functional module is a self-powered sensor module having its own maintenance-free power supply, and set up to acquire physical parameters and to transmit them by wireless to a unit located at some distance.

14. A module receptacle comprising:

a base frame that accepts a positively engaged insert frame, where the insert frame is arranged to accept a positively engaged functional module, the insert frame having latching elements that engage with counter-latching elements in a holding frame, wherein at least one component element in the holding frame extends over a functional module to hold the functional module against the insert frame in such a way that the functional module is fixed in the insert frame, wherein a covering frame is adapted to be fixed by at least one fastening element to the base frame, and wherein the covering frame covers at least the base frame, the insert frame and the holding frame.

* * * * *